United States Patent [19]

Nakajima

[11] Patent Number: 4,757,888
[45] Date of Patent: Jul. 19, 1988

[54] ELECTRO MAGNETIC CLUTCH WITH A ROTATION DETECTOR FOR A REFRIGERANT COMPRESSOR

[75] Inventor: Tadao Nakajima, Haruna, Japan
[73] Assignee: Sanden Corporation, Gunma, Japan
[21] Appl. No.: 35,385
[22] Filed: Apr. 7, 1987

Related U.S. Application Data

[63] Continuation of Ser. No. 838,170, Mar. 10, 1986, abandoned.

[30] Foreign Application Priority Data

Mar. 9, 1985 [JP] Japan ............................ 60-32848[U]

[51] Int. Cl.⁴ ........................................... F16D 27/14
[52] U.S. Cl. ............................. 192/84 C; 192/103 R; 192/150
[58] Field of Search ............... 192/84 C, 150, 56 R, 192/103 R

[56] References Cited

U.S. PATENT DOCUMENTS

| | | | |
|---|---|---|---|
| 3,559,784 | 2/1971 | Miller | 192/84 C X |
| 3,584,715 | 5/1970 | Miller | 192/150 X |
| 3,650,362 | 3/1972 | Davidson | 192/56 R |
| 4,187,938 | 2/1980 | Miller | 192/84 C X |
| 4,293,060 | 10/1981 | Miller | 192/84 C X |
| 4,340,133 | 7/1983 | Blersch | 192/56 R X |
| 4,397,380 | 8/1983 | Yew | 192/84 C |
| 4,572,343 | 2/1986 | Boffelli | 192/150 R |
| 4,627,525 | 12/1986 | Geldec | 192/103 R X |
| 4,632,236 | 12/1986 | Koitabashi | 192/84 C |

OTHER PUBLICATIONS

Japanese Laid Open Publication Application S.N. 58-180842.

Primary Examiner—Carl D. Friedman
Attorney, Agent, or Firm—Banner, Birch, McKie & Beckett

[57] ABSTRACT

There is disclosed an electromagnetic clutch having a rotation detecting device. The electromagnetic clutch has a balance weight which is disposed on the outer end surface of a hub connected to a driven shaft. The detecting device for detecting the rotation of the balance weight is located at the position which faces toward a circumferentially discontinuous part of the balance weight. The construction of the above mentioned electromagnetic clutch is very simple and easy to manufacture. Also, the rotation detecting device can be put on or removed easily.

4 Claims, 1 Drawing Sheet

ELECTRO MAGNETIC CLUTCH WITH A ROTATION DETECTOR FOR A REFRIGERANT COMPRESSOR

This application is a continuation in part of my prior application Ser. No. 838,170, filed Mar. 10, 1986, which application is being abandoned simultaneously with the filing of this application.

TECHNICAL FIELD

The present invention relates to an electromagnetic clutch for a refrigerant compressor and, more particularly, to an electromagnetic clutch for use in a refrigerant compressor of an automobile air conditioning apparatus that includes a rotation detecting device.

BACKGROUND OF THE INVENTION

Generally, a refrigerant compressor for an automotive air conditioning system is driven by an engine through a magnetic clutch. If the operating or driving portions of the compressor lock, the rotation load of the compressor increases excessively. This increased rotation load of the compressor can harm the engine as well as equipment disposed around and coupled to the engine.

The risk of harm to peripheral equipment connected to the engine is even higher in current automobiles because almost all equipment, such as the generator, power steering and water pumps, are driven by a single belt for space considerations. When a compressor continuously driven by an engine through an electromagnetic clutch locks, the belt can break due to the heat produced by the frictional contact between the belt and the electromagnetic clutch. Therefore, in an engine where all of the peripheral equipment are driven with the compressor by a single belt, belt breakage results in the following problems: the car is difficult to steer because the pump for the power steering stops; if the vacuum pump is driven on the same axes as the generator, the damping force of a brake with a vacuum actuator is decreased; the battery dies because the generator stops; and the engine overheats because the water pump stops. These problems make it very difficult to drive and may cause serious accidents.

To solve the above mentioned problems, the compressor is provided with a detecting device which detects rotation or motion of operating parts such as a piston, a driving axis or an inclined plate. When the compressor locks, the detecting device senses the lack of rotation or motion and causes the electromagnetic clutch to cease transmitting driving force from the engine to the compressor, thereby preventing the above mentioned problems. However, the detecting device is normally located within the compressor, creating the sealing and temperature problems around the detecting device. Also because the detecting device must be adapted to the detected portion, a proper detecting device must be designed for each type of compressor. Accordingly, it is difficult to use the same parts in different types of compressors.

One solution to the above mentioned problems is shown in the laid opened publication of Japanese Patent Application No. 58-180842. The hub of a prior art electromagnetic clutch is provided with the projection extending axially outward and a rotation detecting device disposed adjacent to the projection. In the above construction, the rotation detecting device increases compression unbalance. This decreases depressor performance and requires extra parts and space to accommodate the extra parts.

SUMMARY OF THE INVENTION

It is the primary object of this invention to provide an electromagnetic clutch for a refrigerant compressor with a rotation detecting device which does not increase the rotation unbalance of the compressor.

It is another object of this invention to provide an electromagnetic clutch with a rotation detecting device for a refrigerant compressor which is simple to construct.

It is a further object of this invention to provide an improved rotation detecting means in an electromagnetic clutch having improved control and response time as well as more positive action.

These and other objects are achieved in accordance with the present invention by an electromagnetic clutch which includes a coil, a rotor rotatably disposed around the coil and adapted to be driven such as by a drive belt, an armature plate with a gap which faces the rotor, and a hub and a rotation detecting device. The hub is connected to a driven shaft and is coupled to the armature plate by a mechanism which limits axial movement of the armature plate relative to the rotor whereby the armature plate can be pre-stressed in a manner to provide a relatively fast and positive clutch release and an accurate positioning of the armature plate relative to the rotor to provide better control of the movement of the armature plate. At the same time, there is provided in accordance with this invention a balance element for counterbalancing the compressor that also functions to trigger the rotation sensing means.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION

Figure 2:
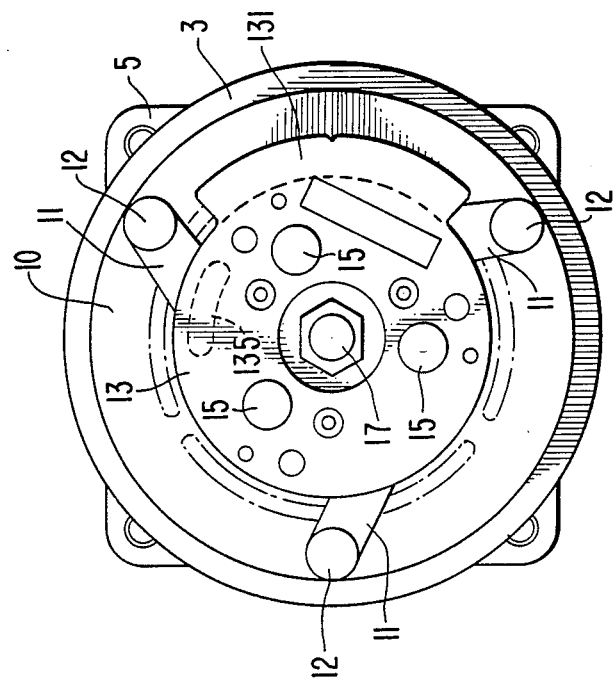
FIG. 2 is a sectional view of substantially on the line II—II of FIG. 1.
Figure 1:
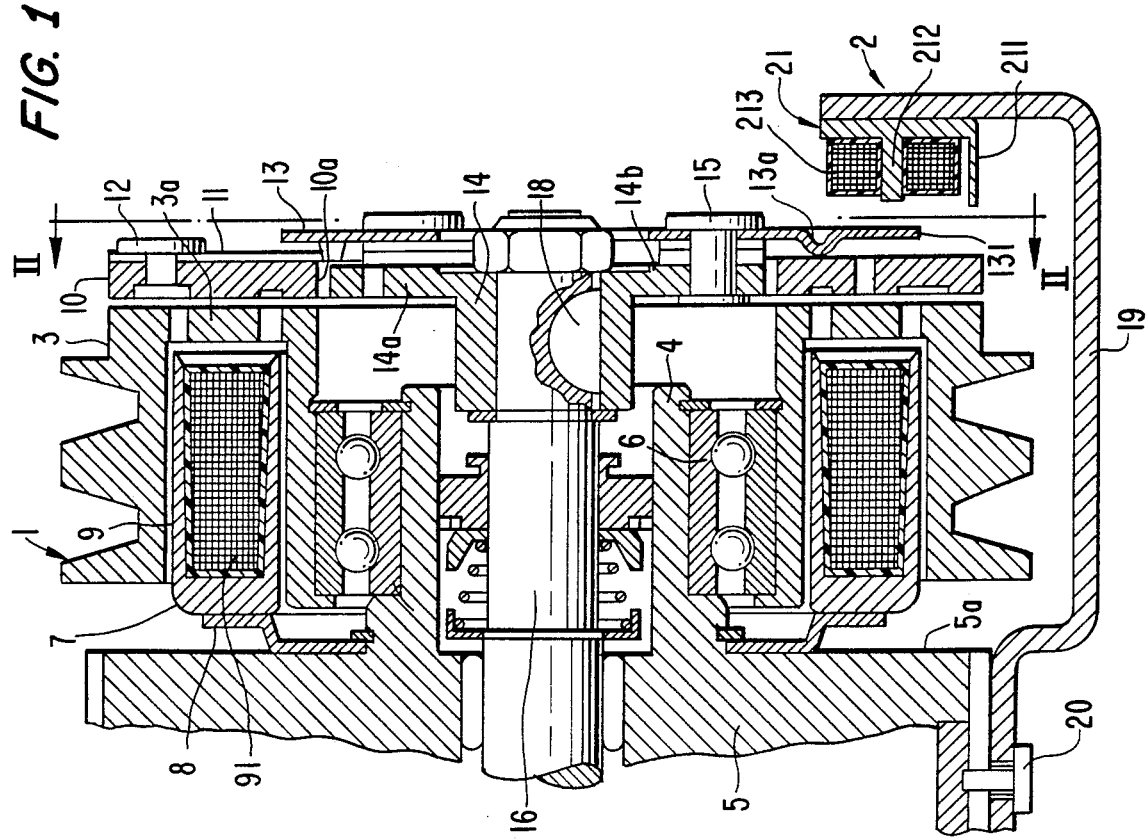
FIG. 1 is a cross sectional view of an electromagnetic clutch in accordance with the present invention.

Referring to FIGS. 1 and 2, an electromagnetic clutch 1 according to this invention is shown. Electromagnetic clutch 1 is diposed on the outer peripheral portion of a tubular extension 4 projecting from an end surface of a compressor housing 5. The tubular extension 4 surrounds a compressor drive shaft 16 that is rotatably supported in the compressor housing 5 through bearings. Electromagnetic clutch 1 includes a clutch rotor 3 which is rotatably supported in tubular extension 4 through ball bearing 6 and is connected to an automobile engine (not shown) through a belt (not shown). An outer terminal end of drive shaft 16 extends from the tubular extension 4 and receives a hub 14 that is fixed thereon by a nut that is screwed onto the threaded end thereof and by a key mechanism 14.

A stopper plate 13 and one end portion of a plurality of leaf springs—three as shown that spaced equi-angularly about the hub 14—are secured by rivets 15 to the outer face of a flange 14a of the hub 14. More particularly, flange 14a of the hub 14 is formed with bosses 14b on which the ends of the springs 11 are seated whereby the free ends of the springs 11 are confined between the face of the flange 14a and the opposed face of the stopper plate 13. The flange 14a and stopper plate 13 are thus spaced apart by the bosses 14b to provide for limited deflection of the free ends of the leaf springs 11.

There is provided an annular armature plate 10 having a central opening 10a that is larger in diameter than the diameter of the flange 14a of the hub 14 whereby the armature plate 10 is adapted to be arranged concentrically relative to the hub 14 with the outer faces thereof substantially coplanar. The free end of each of the leaf springs 11 is fixed to the armature plate 10 by a rivet 12 to support the armature plate 10 flexibly for axial movement upon deflection of the springs 11. The armature plate 10 faces the clutch surface of the clutch plate 3a and is thus supported with a small radial air gap between the armature plate 10 and the hub 14 and a predetermined axial air gap between the armature plate 10 and the rotor 3.

An electromagnet 9 is mounted on the compressor housing 5 concentrically with the drive shaft 16 through a support plate 8. The electromagnet 9 is received within an annular hollow portion formed in the rotor 3 with a surrounding air gap to supply the magnetic flux for attracting the armature plate 10 to the clutch surface of the clutch plate 3a of the rotor 3.

In operation of the electromagnetic clutch, rotor 3 is driven as by a belt by the engine output. When the electromagnetic coil 91 of electromagnet 9 is energized, the armature plate 10 is attracted to the clutch surface of the clutch plate 3a as the springs 11 deflect and, being thus coupled to the rotor 3, is rotated with the rotor 3. The armature plate 10, in turn, rotates the hub 14 on the drive shaft 15 to drive the compressor. When the electromagnetic coil 91 is deenergized, the leaf springs 11 recover to separate the armature plate 10 from the rotor 3 and thus disconnect the drive to the compressor.

Movement of the armature plate 10 out of engagement with the clutch plate 3a under the action of the spring 11 is, as shown, limited by contact of the armature plate 10 against dimples 13a formed in the stopper plate 13. As shown, the stopper plate 13 has a diameter that is slightly greater than the diameter of the hub 14 and overlies the inner portion of the armature plate 10 above the opening 10a, the dimples 13 being formed in that portion of the stopper plate overlying the armature plate 10.

The dimples 13a are high enough relative to the thickness of the armature plate 10 and the relative positions of the stopper plate 13, the armature plate 10 and the clutch plate 3a to limit the movement of the armature plate 10 sufficient only to provide for clearance between the armature plate 10 and the clutch plate 3a and thus to minimize the air gap between them. At the same time the armature plate 10 is positioned in its released position relative to the clutch plate 3a to be able to move into its clutched position within the range of movement of the free end of the springs 11 as the springs deflect between the flange 14a and the stopper plate 13.

The springs 11 are pre-stressed so that the armature plate 10 is biased significantly into the clutch release position. Thus, when the coils 91 are deenergized, the armature plate 10 is moved quickly into and is firmly held in its released position. Conversely when the coils 91 are energized, the armature plate 10 is moved into its clutched position against the action of the springs 11, thus softening or smoothing the engagement. With the springs 11 confined between flange 14a and the stopper plate 13, there is also provided a more stable subassembly of the hub 14, armature plate 10, stopper plate 13 and springs 11.

The stopper plate 13 is also adapted to be provided with a balance weight 131 which, as shown, is formed integrally with the stopper plate 13. The balance weight 131 is designed to counteract the dynamic imbalance in the operation of the compressor. The balance weight 131 also serves to trigger a rotation detecting device 2 which comprises an L-shaped bracket 19 formed of a magnetic material and having a detecting portion 21. Bracket 19 is secured on the compressor housing 5 by rivets 20 and its outer end portion is bent to face the stopper plate 13. Detecting portion 21, which comprises a yoke 211 and coil 213 wound around a center projection 212 thereof, is disposed on the inner surface of the bent portion of the bracket 19 to face the outer surface of the balance weight 131 with a predetermined axial air gap. When the electromagnetic coil 91 of electromagnet 9 is energized, a portion of the magnetic flux flows through the bracket 19 and returns to the armature plate 10 by passing through the air gap between the detecting portion 21 of rotation detecting device 2 and the armature plate 10.

When the compressor is being driven by the engine through the operation of the electromagnetic clutch 1, the balance weight 131 passes through the air gap between the detecting part 21 and the armature plate 10 thus varying the magnetic density of the air gap. When the detecting portion 21 detects the change in the magnetic density, as induced electromagnetic force, it confirms compressor rotation. When the compressor locks, the balance weight 131 no longer passes through the air gap, indicating that the compressor is no longer operating and it functions to deenergize the coils 91, thus releasing the clutch.

Since the balance weight 131 comprises an element of substantial mass, it can be used with a less sensitive detecting means. The counterweight 131 also comprises a relatively isolated element that is spaced radially from the flange 14a for example and axially from the armature plate 10 and thus presents less of a problem in filtering out interference from the other elements of the clutch.

In the embodiment of the invention as discussed above, balance weight 131 is an outward extension from the outer peripheral portion of the stopper plate 13. Alternatively, the balance weight portion may be formed as a hole 135 in the annular shaped stopper plate 13, as shown by the dashed lines in FIG. 2, which hole 135 functions to balance the rotation, and the detecting portion of rotation detecting device 21 is positioned to face the hole 135.

Numerous characteristics, advantages and embodiments of the invention have been described in detail in the foregoing description with reference to the accompanying drawings. The disclosure, however, is illustrative only and it is to be understood that the invention is not limited to the precise illustrated embodiments. Various changes and modifications may be effected therein by one skilled in the art without departing from the scope or spirit of the invention.

I claim:

1. In an electromagnetic clutch comprising a drive shaft, a first rotatable member mounted for rotation about said drive shaft and having an annular clutch plate concentric with the axis of said drive shaft, a second rotatable member having a hub secured to said drive shaft for rotation therewith, an annular armature plate of magnetic material, means for mounting said armature plate on said hub for limited movement relative to said hub in the direction axial thereof, said armature plate facing said clutch plate with an axial gap therebetween, electromagnetic means associated with said clutch plate for attracting said armature plate, a stopper plate attached to said hub in spaced parallel relation outwardly axially thereof and adapted to limit movement of said armature plate in a direction away from said clutch plate, said stopper plate having a balance weight portion extending radially outwardly from the periphery thereof to correct dynamic imbalance, and rotation detecting means disposed adjacent to and facing the path of rotation of said balance weight portion for detecting the passing of said balance weight portion.

2. In an electromagnetic clutch in accordance with claim 1 in which said means for mounting said armature place on said hub comprises a plurality of leaf springs disposed between said hub and said stopper plate, each of said leaf springs being secured at one end to said hub and to said stopper plate and having a free end secured to said armature plate, said hub and said stopper plate being spaced to provide for limited deflection of the free ends of said leaf springs in the direction axially of said hub.

3. In an electromagnetic clutch in accordance with claim 2 in which said armature plate has a central opening and said hub is disposed concentrically of said armature plate within said opening, said stopper plate overlying the hub and the inner portion of said armature plate about said opening, and said balance weight portion being disposed outwardly of the periphery of said hub.

4. In an electromagnetic clutch in accordance with claim 3 in which said leaf springs are pre-stressed to bias said armature plate into its released position relative to said clutch plate.

* * * * *